(12) United States Patent
Grossman et al.

(10) Patent No.: US 9,246,692 B2
(45) Date of Patent: Jan. 26, 2016

(54) SYNCHRONIZING MULTIPLE TRANSCODING DEVICES UTILIZING SIMULTANEITY OF RECEIPT OF MULTICAST PACKETS

(71) Applicant: Google Technology Holdings LLC, Mountain View, CA (US)

(72) Inventors: Michael A. Grossman, San Diego, CA (US); Praveen N. Moorthy, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 253 days.

(21) Appl. No.: 13/896,358

(22) Filed: May 17, 2013

(65) Prior Publication Data

US 2013/0308638 A1 Nov. 21, 2013

Related U.S. Application Data

(60) Provisional application No. 61/649,115, filed on May 18, 2012.

(51) Int. Cl.
*H04L 12/18* (2006.01)
*H04L 29/06* (2006.01)
*H04N 21/2381* (2011.01)
(Continued)

(52) U.S. Cl.
CPC ............ *H04L 12/18* (2013.01); *H04L 12/1881* (2013.01); *H04L 65/607* (2013.01); *H04N 21/2381* (2013.01); *H04N 21/242* (2013.01); *H04N 21/4307* (2013.01); *H04N 21/4381* (2013.01); *H04N 21/64322* (2013.01); *H04N 21/8547* (2013.01)

(58) Field of Classification Search
CPC ............ H04L 65/607; H04L 65/4076; H04N 21/234309; H04N 21/4307; H04N 21/6405; H04N 21/64322
See application file for complete search history.

(56) References Cited

U.S. PATENT DOCUMENTS 5,953,676 A * 9/1999 Berry et al. .................. 455/564
9,055,346 B2 * 6/2015 Grossman ............ H04N 21/654
(Continued)

FOREIGN PATENT DOCUMENTS

EP 1553774 A1 7/2005
WO 2010106075 A1 9/2010

OTHER PUBLICATIONS

Patent Cooperation Treaty, International Search Report and Written Opinion of the International Searching Authority for International Application No. PCT/US2013/041525, Aug. 22, 2013, 9 pages.

*Primary Examiner* — Xavier Szewai Wong
(74) *Attorney, Agent, or Firm* — Fenwick & West LLP (57) ABSTRACT

Disclosed is a method for synchronizing video in a system including a host CPU and a plurality of transcoder instances, the method comprising: receiving, by two or more transcoder instances in the plurality of transcoder instances, a synchronization Internet Protocol ("IP") packet from the host CPU, wherein the synchronization IP packet is received as one packet in a multicast stream of IP packets; detecting, by the two or more transcoder instances in the plurality of transcoder instances, the synchronization IP packet at the same point in the multicast stream; and transcoding, by the two or more transcoder instances in the plurality of transcoder instances, the multicast stream of IP packets immediately after detecting the synchronization IP packet.

20 Claims, 8 Drawing Sheets

(51) Int. Cl.
*H04N 21/242* (2011.01)
*H04N 21/43* (2011.01)
*H04N 21/438* (2011.01)
*H04N 21/643* (2011.01)
*H04N 21/8547* (2011.01)

(56) References Cited

U.S. PATENT DOCUMENTS

| | | | |
|---|---|---|---|
| 2003/0039223 A1* | 2/2003 | Dupuy | 370/328 |
| 2004/0218527 A1 | 11/2004 | Schwartz | |
| 2005/0122990 A1* | 6/2005 | Parys | 370/449 |
| 2007/0025325 A1* | 2/2007 | Kumar | H04L 47/10 370/350 |
| 2007/0071037 A1* | 3/2007 | Abraham et al. | 370/503 |
| 2008/0170531 A1 | 7/2008 | Petry et al. | |
| 2009/0154556 A1* | 6/2009 | Kim | H04L 65/1083 375/240.02 |
| 2009/0168903 A1* | 7/2009 | Vaquero | H04N 21/2368 375/240.28 |
| 2009/0201988 A1 | 8/2009 | Gazier et al. | |
| 2010/0158126 A1* | 6/2010 | Bai et al. | 375/240.16 |

* cited by examiner

SYNCHRONIZING MULTIPLE TRANSCODING DEVICES UTILIZING SIMULTANEITY OF RECEIPT OF MULTICAST PACKETS

CROSS-REFERENCE TO RELATED APPLICATIONS

The present application claims priority to U.S. Provisional Patent Application 61/649,115, filed on May 18, 2012, which is incorporated by reference herein in its entirety.

TECHNICAL FIELD

The present disclosure is related generally to video encoding and, more particularly, to synchronized encoding.

BACKGROUND

Transcoder products have typically been limited to one or two channels. However, system-on-a-chip ("SOC") technologies allow a transcoder product to integrate a larger number of transcoder channels into a single chassis via multiple transcoder SOC instances. The transcoder SOC instances may perform transcoding in parallel. A host central processor unit ("CPU") communicates with each of the transcoder SOC instances to coordinate the transcoding. When using multiple transcoder instances, unless the transcoders are initialized or synchronized to begin transcoding at the same time, there may be a time delay or gap in information (e.g., misaligned segments) from one transcoder to another. This may cause problems for streaming video, such as when changing from one resolution or compression rate to another if the segments from one compression rate do not align with the segments from another compression rate. This not-so-seamless transition is undesirable for viewers and should be minimized or eliminated.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In a first aspect, a method for synchronizing video in a system including a host CPU and a plurality of transcoder instances is disclosed, the method comprising: receiving, by two or more transcoder instances in the plurality of transcoder instances, a synchronization Internet Protocol ("IP") packet from the host CPU, wherein the synchronization IP packet is received as one packet in a multicast stream of IP packets; detecting, by the two or more transcoder instances in the plurality of transcoder instances, the synchronization IP packet at the same point in the multicast stream; and transcoding, by the two or more transcoder instances in the plurality of transcoder instances, the multicast stream of IP packets immediately after detecting the synchronization IP packet.

In a second aspect, an apparatus configured to synchronize video in a system including a host CPU and a plurality of transcoder instances is disclosed, the apparatus comprising: one or more computer processors; and a non-transitory computer-readable storage medium containing instructions that, when executed, control the one or more computer processors to be configured for: receiving, by two or more transcoder instances in the plurality of transcoder instances, a synchronization IP packet from the host CPU, wherein the synchronization IP packet is received as one packet in a multicast stream of IP packets; detecting, by the two or more transcoder instances in the plurality of transcoder instances, the synchronization IP packet at the same point in the multicast stream; and transcoding, by the two or more transcoder instances in the plurality of transcoder instances, the multicast stream of IP packets immediately after detecting the synchronization IP packet.

Figure 1:
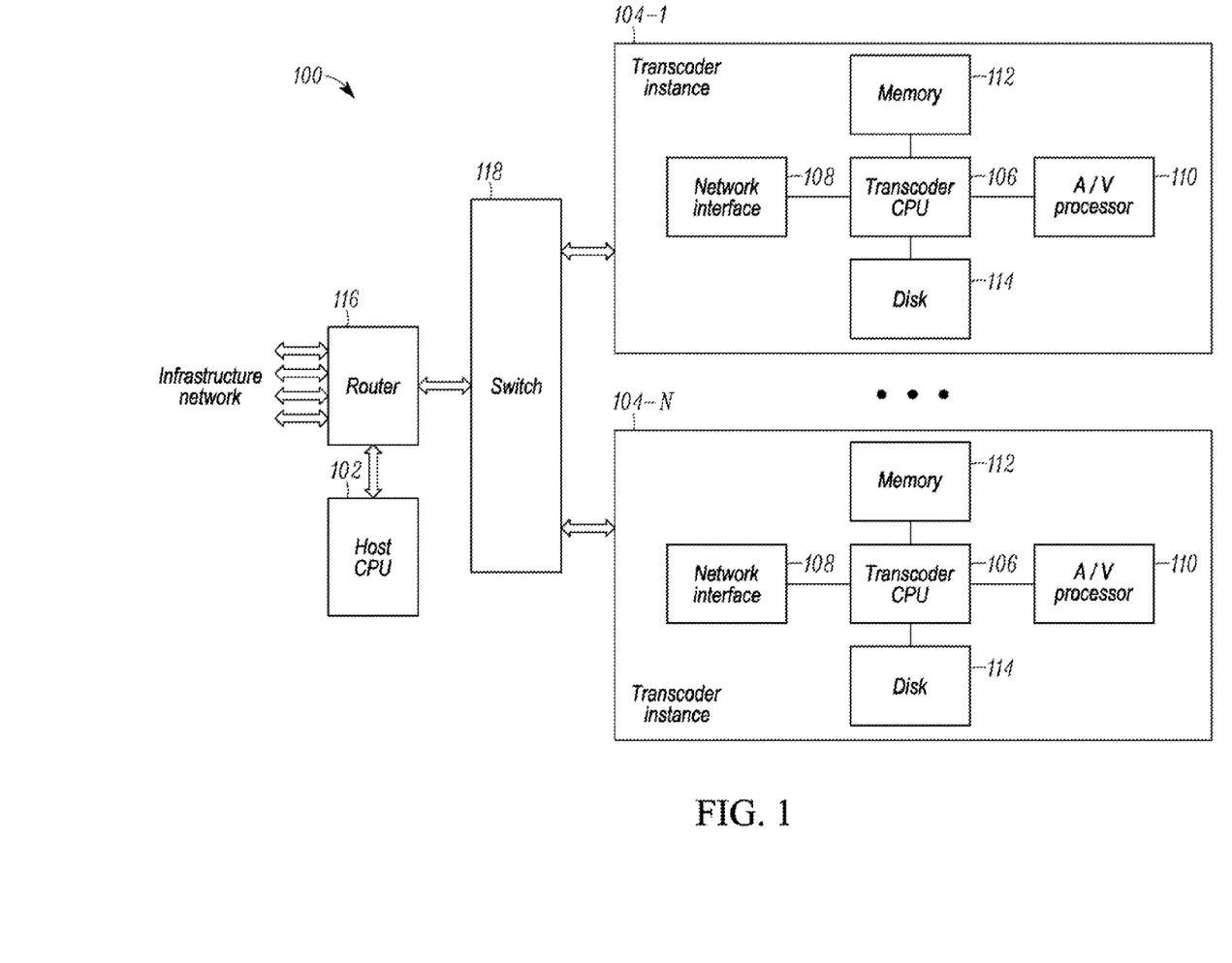
FIG. 1 depicts a system for transcoding video according to some embodiments.

FIG. 1 depicts a system 100 for transcoding video according to some embodiments. In some embodiments, system 100 is integrated into a single transcoding device, such as a single chassis device (e.g., a 1RU rack unit). Additionally, system 100 may include multiple rack units that communicate together via an IP network backplane to transcode video.

A host CPU 102 is configured to communicate with multiple transcoder instances 104-1 through 104-N. Host CPU 102 coordinates transcoding operations to be performed on transcoder instances 104-1 through 104-N. Although one host CPU 102 is shown, system 100 may include multiple host CPUs.

Transcoder instances 104 may be SOC entities. Transcoder instances 104 may include a transcoder CPU 106 in addition to other entities, such as a network interface 108, an audio/video ("A/V") processor 110, memory 112, and disk storage 114. Particular embodiments allow host CPU 102 to offload functions normally performed by host CPU 102 to transcoder instances 104 because each transcoder instance 104 includes a transcoder CPU 106 that is capable of performing at least some functions normally performed by host CPU 102. Transcoder CPUs 106 may perform the functions in parallel within transcoder instances 104. Each transcoder CPU 106 may be responsible for performing tasks within a respective transcoder instance 104 or for other transcoder instances.

In some embodiments, host CPU 102 uses a routing system, such as router 116 and switch 118, to communicate with transcoder instances 104. In some embodiments, the use of router 116 and switch 118 (or other comparable routing systems) allows host CPU 102 to communicate using IP packets. For example, each transcoder instance 104 may include a network interface 108 that can receive IP packets. This allows communication between host CPU 102 and transcoder instances 104 via a universal networking standard, such as Ethernet. In such cases, host CPU 102 does not need to send control signals via a PCI bus or communicate video via an MPEG transport stream. Rather, the control signals and video data may be encapsulated in IP packets and routed via router 116 and switch 118 to transcoder instances 104.

By sending video data in IP packets, FPGA logic is not needed to process or send video data in a video transport stream outside of transcoder instances 104. The video transport stream may use a standard for transcoding video, such as an MPEG. Host CPU 102 may offload the processing of the video transport stream to transcoder instances 104. For example, video data are encapsulated in the IP packets. Transcoder CPU 106 receives the IP packets through network interface 108. Because A/V processor 110 needs to perform transcoding operations on a video transport stream, transcoder instance 104 needs to convert the video in the payload of the IP packets to the video transport stream. Network interface 108 can de-capsulate the received IP packets to retrieve the video data from the payload of the IP packets. Transcoder CPU 106 may then coordinate generation of a video transport stream. Once in this format, transcoder instance 104 can perform various transcoding services on the video transport stream. For example, A/V processor 110 may transcode (e.g., decode and encode) the video transport stream.

Host CPU 102 may also send control commands in IP packets. Transcoder CPU 106 may then de-capsulate the IP packets to determine the control signals, which are then processed by transcoder CPU 106. Not only are the video data and control signals sent via the same channel and network interface, expensive PCI silicon and FPGA logic are not needed outside of the transcoder instances 104.

Figure 2:
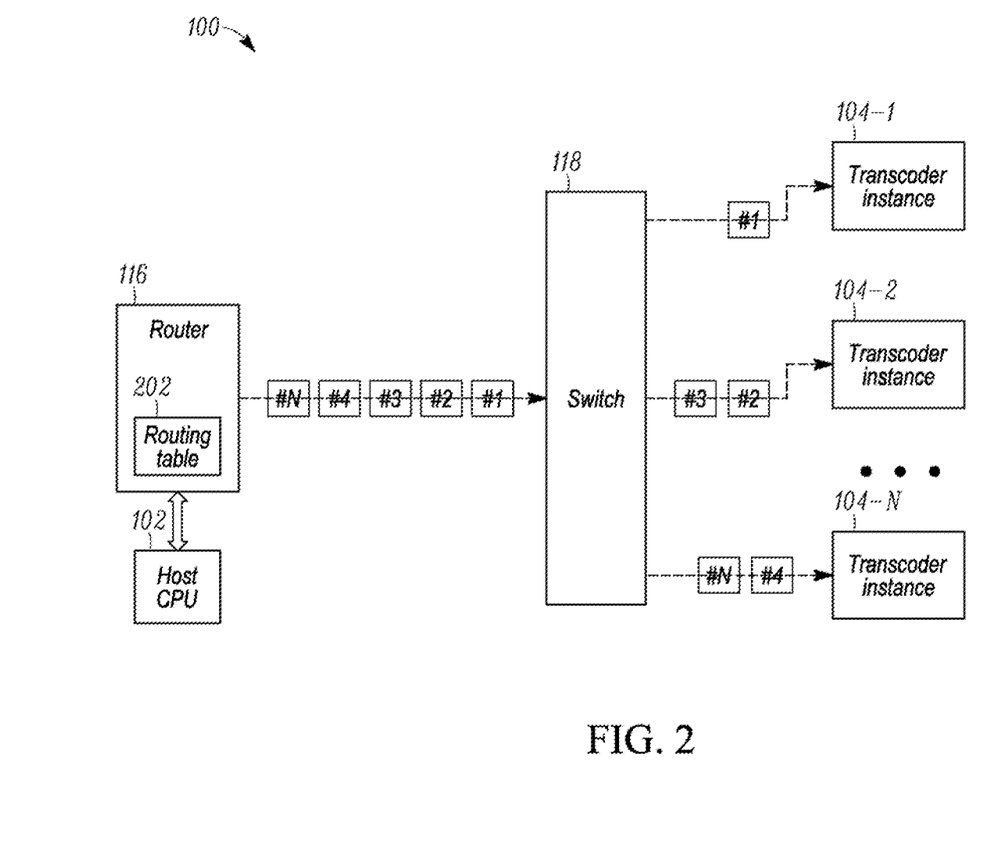
FIG. 2 depicts an example of routing IP packets according to some embodiments.

FIG. 2 depicts an example of routing IP packets according to some embodiments. Router 116 receives packets from the network infrastructure. For example, the packets include video that needs to be transcoded. Host CPU 102 coordinates the routing of packets to transcoder instances 104. For example, as is discussed in more detail below, a multicast configuration may be used to route packets to specific transcoder instances 104.

In some examples, router 116 is routing packets #1 through N. In some examples, router 116 uses a routing table 202 to determine where to route the packets. For example, the IP packets are routed depending on what stream the packets are associated with. As is described below, transcoder instances 104 subscribe to various streams. For simplicity, the routing is described as routing different packets to different transcoder instances 104. For example, router 116 routes an IP packet #1 to transcoder instance 104-1, routes IP packets #2 and #3 to transcoder instance 104-2, and routes IP packets #4 through #N to transcoder instance 104-N. Switch 118 sends the IP packets to transcoder instances 104.

In some embodiments, router 116 queries the network to determine which devices on a particular network port have joined the IP multicast. Router 116 does not forward the multicast IP traffic to devices on the network that have not joined. Switch 118, connected to router 116, in turn may utilize Internet Group Management Protocol ("IGMP") snooping to determine which instances connected to switch ports have joined the IP multicast. Switch 118 then sets up Ethernet port filtering to inhibit the flow of IP packets to instances that have not joined. For instances that have joined, switch 118 forwards the identified packets from the correct queue.

Routing video within IP packets is different from sending a video transport stream to transcoder instances 104. That is, router 116 and switch 118 route IP packets using an IP protocol, such as Ethernet. When sending video in a video transport stream, the video data are sent serially. Serial data are sent 1 bit at a time over an interface. Thus, FPGA logic is needed to send the video. However, encapsulating the video in IP packets does not require FPGA logic to send a serial stream of data. Rather, multiple bits of data are sent in parallel.

Figure 3:
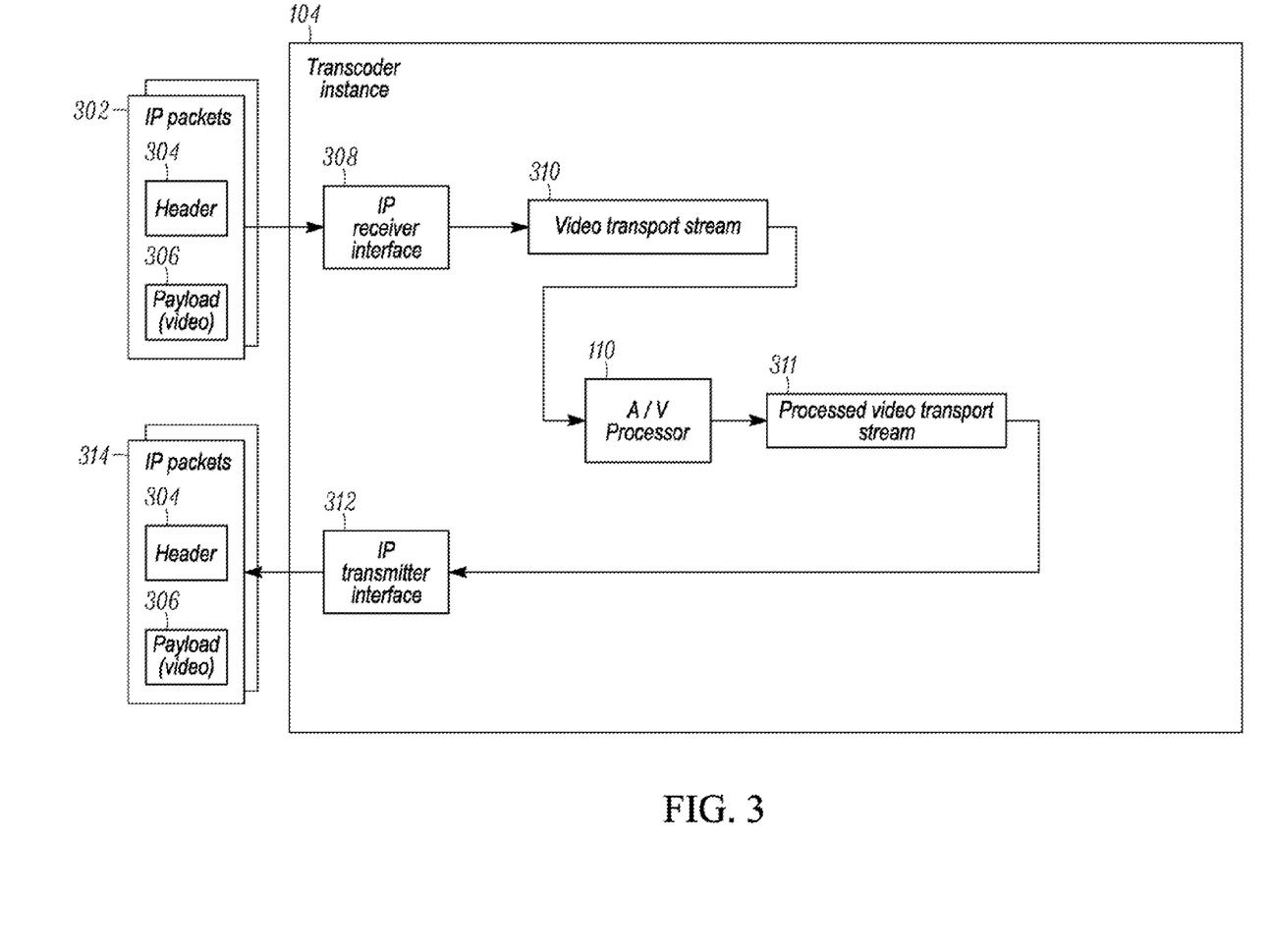
FIG. 3 depicts an example of processing IP packets within a transcoder instance according to some embodiments.

Once receiving the IP packets, transcoder instances 104 need to process the IP packets to retrieve the information included within the payload of the IP packets. For example, the control information and video may be included in the payload of an IP packet. FIG. 3 depicts an example of processing IP packets 302 within a transcoder instance 104 according to one embodiment. IP packets 302 are in the format governed by a universal networking standard, such as Ethernet. In general, each IP packet 302 includes a header 304 and a payload 306. Header 304 may include supplemental data that describe the data being transmitted and how the IP packet should be routed. For example, header 304 includes a destination address. Payload 306 includes the video being transmitted. As is known, the IP packet 302 encapsulates the video in payload 306. Transcoder instance 104 needs an interface to receive IP packet 302. Because IP is a universal standard, the interface that is used is a standard IP interface, such as an IP receiver interface 308.

To process the video within payload 306, IP receiver interface 308 needs to convert the video into a video transport stream, such as an MPEG transport stream, that is in a format defined by the standard being used to encode or decode the video. IP receiver interface 308 may convert the data into the video transport stream as shown at 310. In some embodiments, this converts the video in payload 306 from a parallel format to a serial format. Internal to the transcoder SOC, the parallel MPEG transport stream payload may be processed by a hardware block that performs the serialization of the transport stream prior to video decoding. The video transport stream is the format in which transcoding can be performed.

A/V processor 110 receives the transport stream and performs a transcoding operation on the stream. For example, A/V processor 110 encodes or decodes the transport stream. Other operations may also be performed, such as packaging. The different types of services are described in more detail below.

After processing, A/V processor 110 outputs the processed video transport stream from transcoder instance 104 at 311. Before the stream can be transmitted from transcoder instance 104, transcoder instance 104 needs to encapsulate the video that is in the video transport stream format to IP packets again. This is because system 100 processes IP packets and not a video transport stream outside of transcoder instances 104. In such cases, an IP transmitter interface 312 encapsulates the processed video transport stream into one or more IP packets 314. This converts the data from a serial format to a parallel format. IP transmitter interface 312 then transmits IP packets 314 through switch 118 to router 116. Host CPU 102 then handles routing of IP packets 314. For example, host CPU 102 may route IP packets 314 to another transcoder instance 104 or to a destination, such as a decoder.

Figure 4:
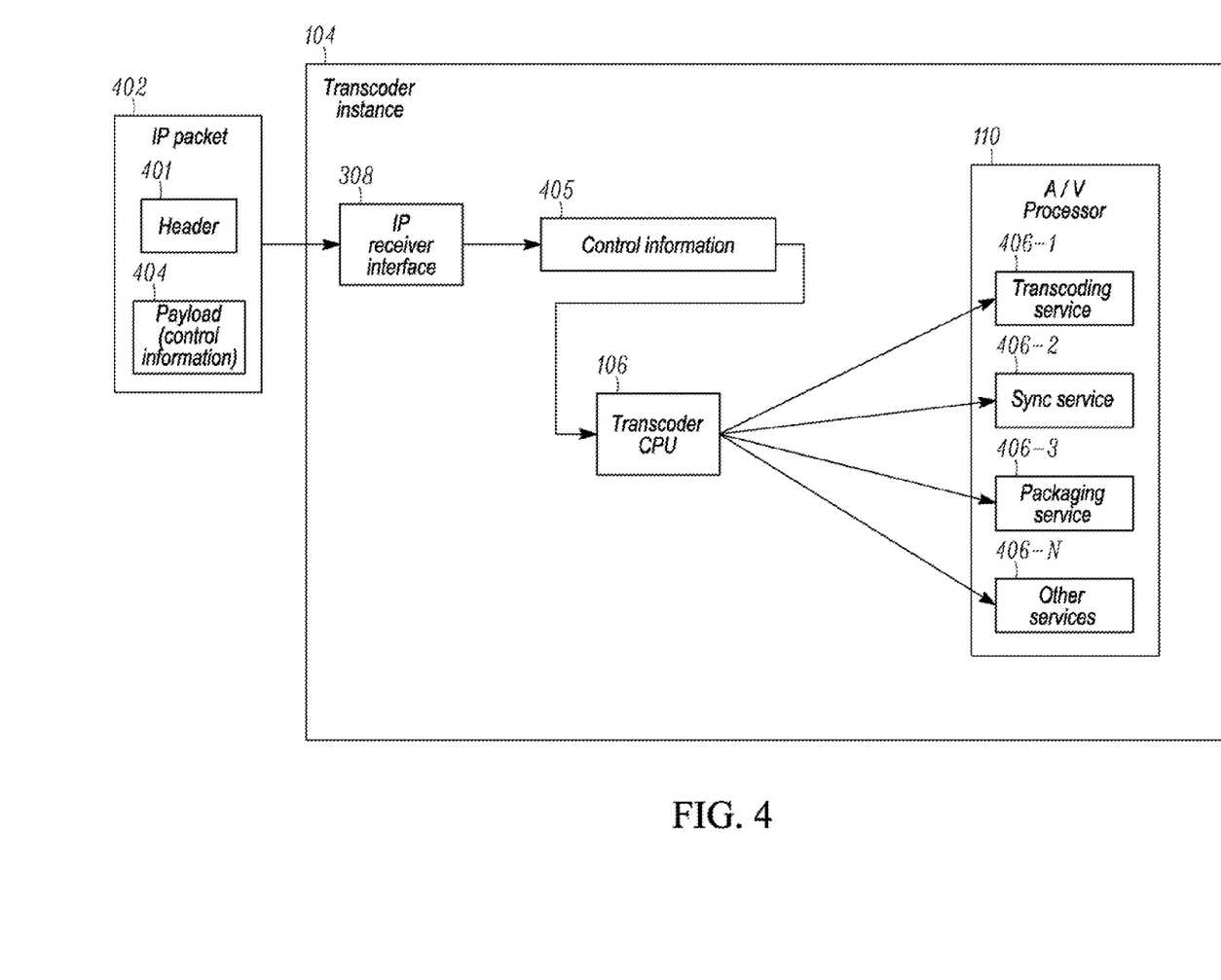
FIG. 4 depicts an example of processing IP packets that include control information according to some embodiments.

In addition to routing video through IP packets, system 100 may send control information through IP packets. The control information provides information to transcoder instances 104 that can be used when performing transcoding operations or services. For example, the control information may synchronize the transcoding being performed among multiple transcoder instances 104. FIG. 4 depicts an example of processing IP packets that include control information according to some embodiments. Router 116 receives an IP packet 402 with control information in a payload 404. IP packet 402 also includes a header 401 that identifies the payload as including control information. Router 116 routes IP packet 402 via switch 118 to a transcoder instance 104. The control information is thus sent through the same channel as the video data.

Transcoder instance 104 may de-capsulate IP packet 402 to determine the control information from payload 404. For example, IP receiver interface 308 receives IP packet 402 and decapsulates the payload to output the control information shown at 405. Transcoder CPU 106 interprets the control information when performing services. For example, transcoder CPU 106 uses the control information to control A/V processor 110 when performing services such as a transcoding service 406-1, a synchronization (sync) service 406-2, a packaging service 406-3, or other services 406-N. Transcoding service 406-1 performs encoding or decoding of the video data. Synchronization service 406-2 synchronize the transcoding among multiple transcoding instances 104. Packaging service 406-3 cuts video and audio streams into files for delivery to Internet-connected devices, such as smartphones and tablets. Packaging may also need synchronization among different transcoder instances 104. Thus, sending control information via the same channel as the video allows the synchronization to be performed; whereas, when control information was sent through a different channel using a PCI bus, it was hard to synchronize the data that were received with the control information.

Figure 5:
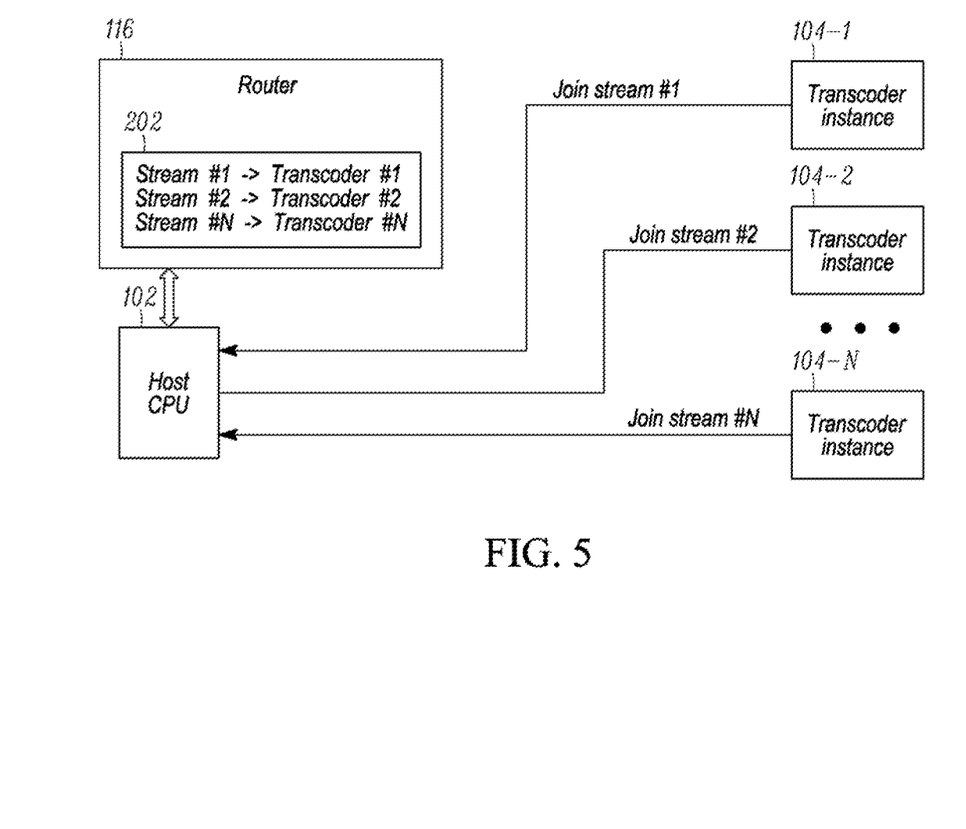
FIG. 5 shows an example of joining a multicast stream according to some embodiments.

The routing of video to various transcoder instances 104 is simplified because IP packets can be routed to transcoder instances 104. For example, router 116 uses a multicast system to determine where to route IP packets. FIG. 5 shows an example of joining a multicast stream according to one embodiment. When transcoder instances 104 want to process video through a stream, each transcoder instance 104 sends a "join stream" command to host CPU 102. For example, host CPU 102 receives join commands for different streams from different transcoder instances 104. In a specific example, transcoder instance 104-1 sends a join for stream #1, transcoder instance 104-2 sends a join for stream #2, and a transcoder instance 104-N sends a join for stream #N.

Based on receiving the join commands, host CPU 102 populates routing table 202 with information on how to route IP packets for various streams. For example, host CPU 102 adds an identifier to a stream in routing table 202 for transcoder instances that join certain streams. For stream #1, host CPU 102 adds the identifier for transcoder instance 104-1. For stream #2, host CPU 102 adds the identifier for transcoder instance 104-2. For stream #N, host CPU 102 adds the identifier for transcoder instance 104-N. Once routing table 202 is populated with which transcoder instances 104 joined which streams, router 116 leverages routing table 202 to route IP packets for the streams.

Recently, Hypertext Transfer Protocol ("HTTP") based live streaming protocols have been widely adopted to download or stream audio video ("AV") content to portable devices. For example, referring now to FIG. 6, content prepared by or delivered from an HTTP server (not shown) is classified as HTTP adaptive streaming. Adaptive streaming operates by dynamically adjusting the play-out rate to stay within the actual network throughput to a given endpoint without the need for rebuffering. So, if the network throughput suddenly drops, the picture may degrade, but the end user still sees a picture.

As used herein, HTTP adaptive streaming is the generic term for various implementations: Apple HTTP Live Streaming, Microsoft IIS Smooth Streaming, Adobe HTTP Dynamic Streaming, and MPEG DASH.

Although each of the various implementations of HTTP adaptive streaming is different, they all share a set of common properties. For example, still referring to FIG. 6, source content 610 is transcoded in parallel at multiple bit rates (e.g., multi-rate coding) in a transcoding process 620. Each bit rate is called a profile or a representation. As shown, the source content 610 may comprise media content such as live source content or file source content. For example, the file source content may include movies, TV programs, etc. The live source content includes live streaming format, such as a live broadcast of a sports program or game.

Figure 6:
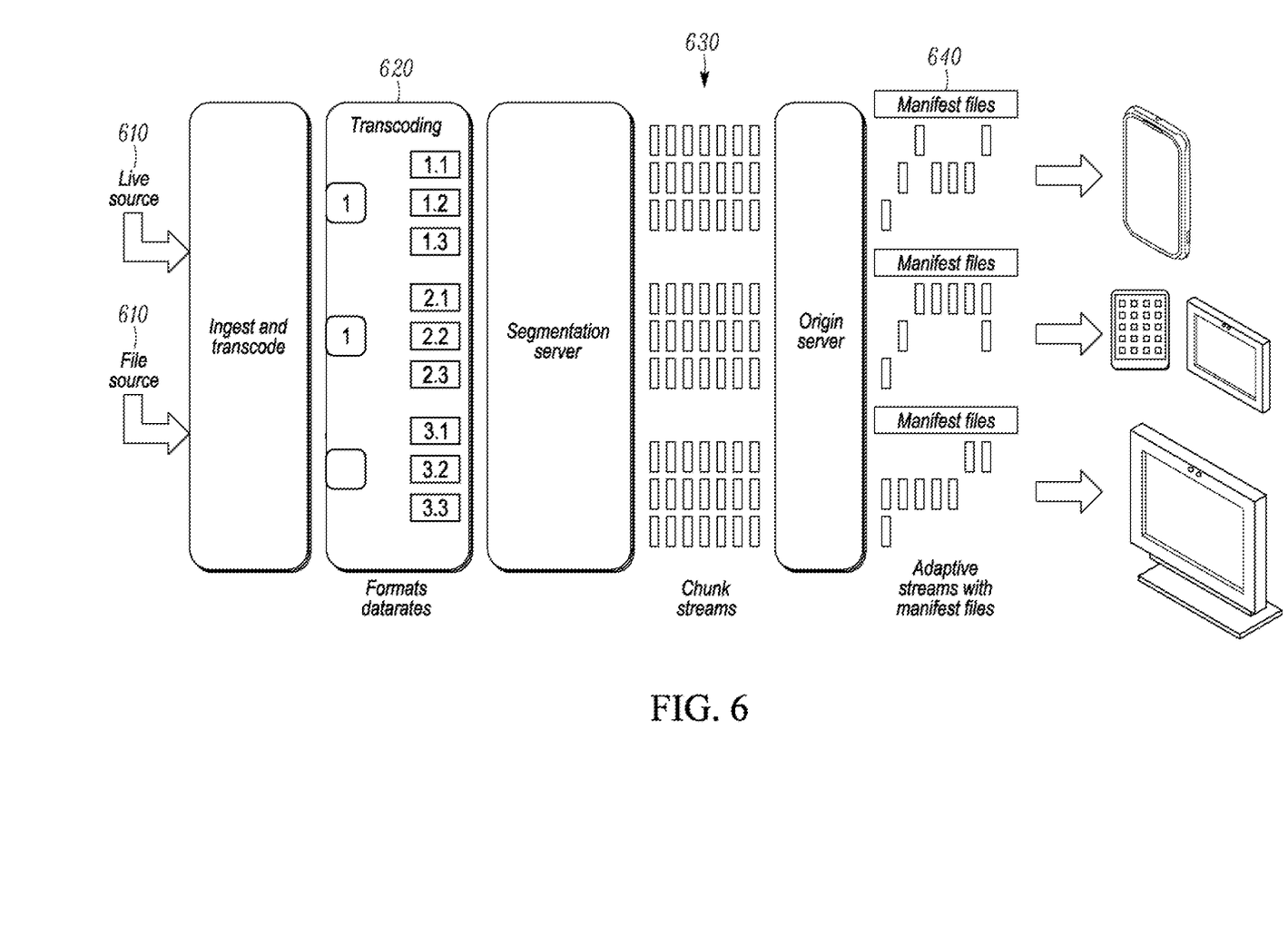
FIG. 6 shows an example of a process for ingesting, transcoding, segmenting, and adaptive streaming in accordance with some embodiments.

Encoded content is divided into fixed duration segments (e.g., chunks) in a segmentation process 630. The segments or chunks are typically between two and 10 seconds in duration, although they may be longer or shorter. In some embodiments, shorter segments reduce coding efficiency while larger segments impact speed to adapt to changes in network throughput.

A manifest file is created and updated as necessary to describe the encoding rates and URL pointers to segments in a manifest file creation process 640. As used herein, a manifest file or playlist describes how content is prepared in how many different encoding bitrates and, for each bitrate stream, how long a segment is and where to obtain each segment of each bitrate stream.

In some embodiments, the client uses HTTP to fetch segments from the network, buffer them, and then decode and play them. The client may utilize one or more algorithms designed to select the optimum profile so as to maximize quality without risking buffer underflow and stalling (e.g., rebuffering) of the play-out. For example, each time the client fetches a segment, it may choose the profile based on the measured time to download the previous segment.

In some embodiments, the HTTP server could publish a variant playlist file with multiple entries for the same AV content, each of these entries representing a stream with unique encoding parameters. The client initially downloads the variant playlist file and, depending upon the network conditions, downloads the media files with the most appropriate encoding parameters (e.g., using one or more algorithms described above).

Generating the multitude of streams each with unique encoding parameters commonly requires a multi-transcoder architecture. Synchronization across multiple transcoders becomes a challenge. Depending on network conditions, the client requests different bitrate streams from the initially downloaded variant playlist file. Subsequently, during bitrate switching, the client could request the next sequence number media file at a different bitrate with the expectation that the audio and video will play smoothly, without any discontinuities. This requires that each of the segments will be perfectly aligned even though they might have been generated by a separate transcoder device.

Commonly, multicast is used as the IP protocol to alleviate the need to send separate streams to each transcoder. To avoid misalignment of the transcoded streams, a mechanism is needed to synchronize the transcoder devices so that they all start transcoding at the same point, ensuring that all segments are aligned.

Figure 7:
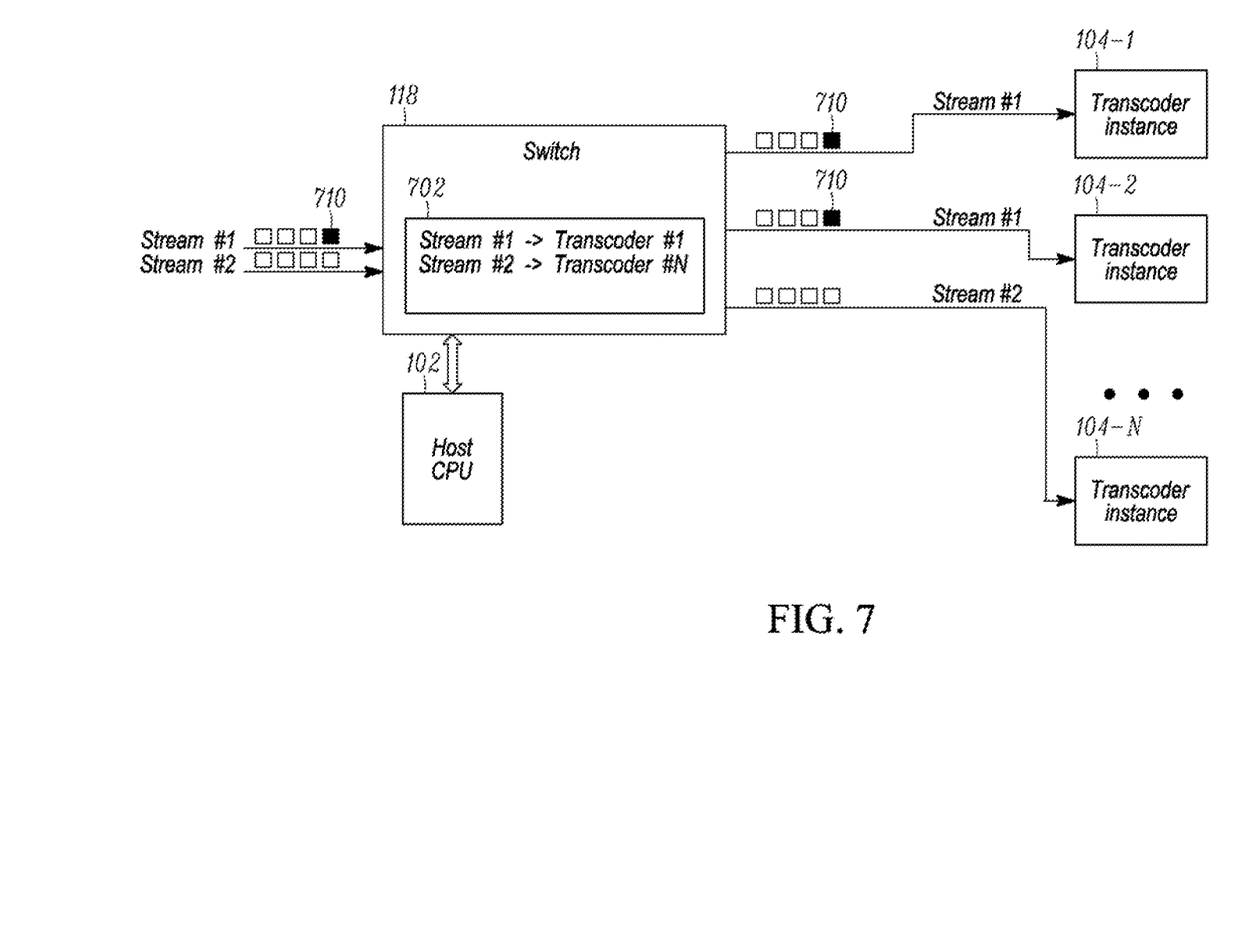
FIG. 7 shows an example of routing IP packets using a multicast architecture according to some embodiments.

FIG. 7 shows an example of routing IP packets using a multicast architecture according to one embodiment. Switch 118 receives streams #1 and #2 (although there may be up to #N streams). When switch 118 receives the streams, switch 118 checks which transcoder instances 104 have joined each stream using switching table 702. In this case, switch 118 sends stream #1 to transcoder instance 104-1 and to transcoder instance 104-2 and sends stream #2 to transcoder instance 104-N. Unlike sending a video transport stream, the above switching scheme can be performed without using a large amount of host CPU resources. This is because host CPU 102 offloads the processing of the video transport stream to transcoder instances 104. This frees up host CPU 102, and host CPU 102 does not become a bottleneck in system 100.

In FIG. 7, the multiple transcoder instances 104-1, 104-2, 104-N may be synchronized by using, e.g., a simultaneity of multicast protocol for both AV content and control information. In some embodiments, switch 118 comprises a managed switch that may be configured to perform IGMP snooping and to filter out multicast packets that have not joined the multicast. Generally IGMP snooping is the process of listening to IGMP network traffic. The feature allows switch 118 to listen in on the IGMP conversation between, e.g., hosts and routers. By listening to these conversations, the switch 118 maintains a map of which links need which IP multicast streams. Multicasts may be filtered from the links which do not need them, and thus the switch 118 controls which ports receive specific multicast traffic.

In some embodiments, transcoder instances 104-1, 104-2, 104-N are interconnected via switch 118. Switch 118 may be configured to send multicast traffic to each transcoder instance separately. For example, if a variant playlist file has 12 unique entries of encoded streams, and each transcoder instance is capable of creating four transcoded streams, a cluster of three transcoder instances will be required as a minimum.

In some embodiments, host CPU 102 is configured to allocate the resources and to configure the transcoder instances to join the multicast. Once all the transcoder instances have joined, the multicast stream may be simultaneously sent to each transcoder instance. In some embodiments, each transcoder instance will not start transcoding until host CPU 102 sends a synchronization multicast packet 710. Synchronization multicast packet 710 may be sent on the same multicast IP address inserted such that it may be detected at the same point in the stream at each transcoder instance (e.g., when there is no packet re-ordering). In some embodiments, the synchronization multicast packet is a MPEG null packet with a distinctive code word to identify it. A purpose of the synchronization packet is to simultaneously demarcate the transcoding start point to all transcoder instances.

In some embodiments, switch 118 uses pointers to send out data. For example, switch 118 may use a pointer mechanism to directly copy the packet data from the input buffer to multiple switch output port destinations without making separate copies of the data, ensuring that the packets are inserted into the multicast stream at exactly the same point. Thus, switch 118 may be predicated on using pointers instead of moving actual data. This ensures that data are not actually copied or buffered, making it arbitrary where synchronization multicast packet 710 is inserted into the stream.

Additionally, in some embodiments, host CPU 102 may use a timer or clock to determine or dictate an initialization time for synchronization multicast packet 710. In some embodiments, synchronization multicast packet 710 is received by transcoder instances at the same time. This may ensure that each transcoder instance begins transcoding at the same time (e.g., the same point in the AV content), thus creating aligned segments across the transcoder instances.

For example, still referring to FIG. 7, host CPU 102 may be configured to insert one or more synchronization multicast packets 710 into each multicast stream. As shown, a single synchronization multicast packet 710 is inserted into Stream #1. Host CPU 102 may insert the synchronization multicast packet 710 into one or more multicast streams prior to the streams being received by switch 118. For example, host CPU 102 may transmit the synchronization multicast packet 710 on the same IP address and port number. Alternatively, the host CPU 102 may communicate with switch 118 to have switch 118 insert the synchronization multicast packets 710 into the correct streams (e.g., if switch 118 has an IP-connected CPU to generate the packet). After being sent by switch 118, transcoder instances 104-1 and 104-2 receive synchronization multicast packet 710 at the same point in time in the AV content. Because Stream #2 did not include a synchronization multicast packet 710, transcoder instance 104-N does not receive a synchronization multicast packet 710.

While the use of a synchronization multicast packet is an elegant solution to ensure that the transcoders begin transcoding at exactly the same time, so that all segments across transcoders are aligned, other tools and methods may also be implemented. For example, port filtering may be used to inhibit the flow of IP packets to the individual transcoders until all transcoders have joined the multicast. Thereafter, when the flow of IP packets is initiated, each transcoder instance would begin parsing at exactly the same point, ensuring transcoding commences at the next Group of Pictures boundary.

Figure 8:
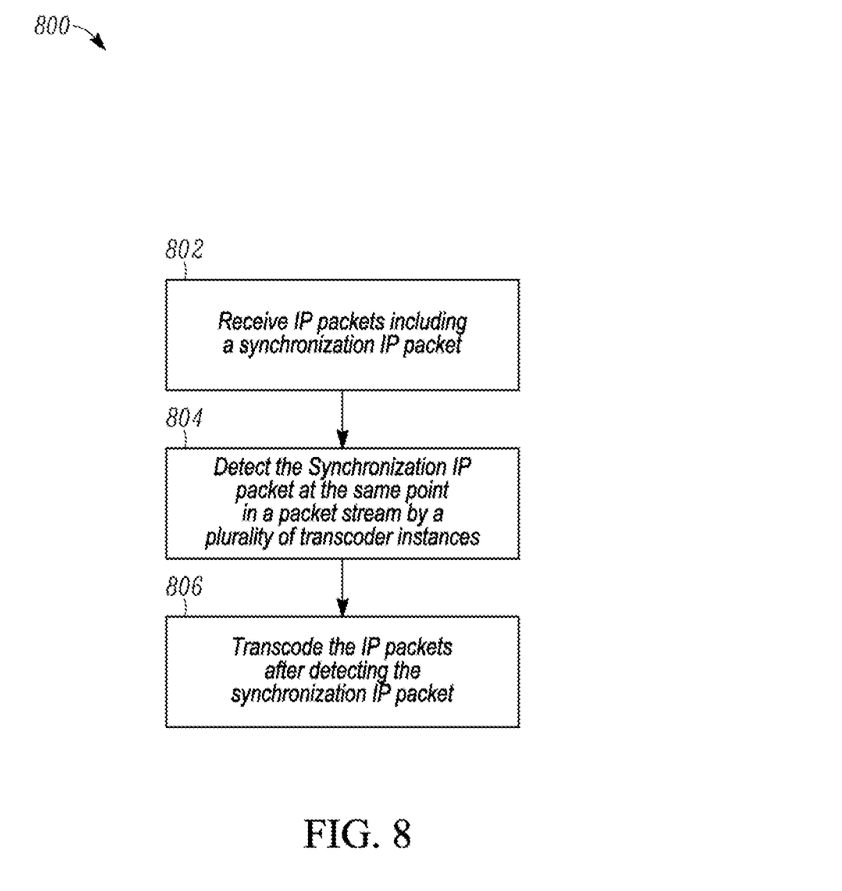
FIG. 8 depicts a simplified flowchart of a method for processing IP packets in a transcoder instance according to some embodiments.

FIG. 8 depicts a simplified flowchart 800 of a method for processing IP packets in a transcoder instance 104 according to one embodiment. At 802, two or more transcoder instances 104 receive IP packets, including a synchronization IP packet. At 804, the two or more transcoder instances detect the synchronization IP packet at the same point in the IP packet stream. At 806, the two or more transcoder instances transcode the IP packets after detecting the synchronization IP packet.

System 100 may be configured in a modular architecture. For example, a modular architecture allows for a wide range of transcoder solutions to be packaged within the same chassis and backplane design without the need to re-design other parts of the system. By providing an IP-based interface, such as IP receiver interface 308 and IP transmitter interface 312, the interfaces are standardized for transcoder instances 104. That is, each transcoder instance 104 would use the same protocol to send and receive IP packets. However, if the conventional MPEG transport stream for video and PCI being used for control is used, different transcoder instances 104 may use proprietary non-IP based interfaces that would not allow common interfacing techniques to be used. That is, when a transcoder instance 104 needs to be inserted into system 100, the proprietary non-IP based interface would not allow for a modular architecture to be realized. Rather, programming to insert the new transcoder instance 104 would be needed to interface with the proprietary interface. However, because system 100 includes a common IP-based backplane design in which each transcoder instance 104 communicates via an IP protocol, such as Ethernet, to router 116 and switch 118 for both control and also communication of video, transcoder instances 104 may be removed and inserted in a modular fashion. That is, reconfiguration of the system is not needed to insert various transcoder instances 104.

Also, the use of an IP-based backplane design for communication enables system 100 to be highly scalable by cascading multiple Ethernet switches 118 and routers 116. That is, additional routers and switches may be added as additional transcoder instances 104 are added.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for synchronizing video in a system including a host central processing unit ("CPU") and a plurality of transcoder instances, the method comprising:
    receiving, by two or more transcoder instances in the plurality of transcoder instances, a synchronization Internet Protocol ("IP") packet in a multicast stream of IP packets from the host CPU, wherein the synchronization IP packet comprises at least one distinctive code word to identify the synchronization IP packet among the IP packets of the multicast stream;
    detecting, by the two or more transcoder instances in the plurality of transcoder instances, the synchronization IP packet at the same point in the multicast stream, the point in the multicast stream detected by the two or more transcoder instances indicating a starting point to transcode the multicast stream of IP packets simultaneously by the two or more transcoder instances; and
    transcoding, by the two or more transcoder instances in the plurality of transcoder instances, the multicast stream of IP packets that begins from the indicated starting point responsive to detecting the synchronization IP packet.

2. The method of claim 1 wherein the plurality of transcoder instances are in communication with a switch and wherein the switch is configured to receive the multicast stream of IP packets and send the multicast stream of IP packets to predetermined transcoder instances.

3. The method of claim 2 wherein the switch is configured to use pointers to prevent multicast stream IP packet data from being copied or buffered by the plurality of transcoder instances.

4. The method of claim 2 wherein the host CPU is in communication with the switch and wherein the host CPU is configured to insert the synchronization IP packet in the multicast stream.

5. The method of claim 4 wherein the host CPU is configured to insert the synchronization IP packet into the multicast stream prior to the switch receiving the multicast stream.

6. The method of claim 4 wherein the host CPU is configured to use a timer to determine an initialization time for the synchronization IP packet such that the synchronization IP packet is received by the two or more transcoder instances in the plurality of transcoder instances at the same point in the multicast stream.

7. The method of claim 4 wherein the host CPU is configured to control the plurality of transcoder instances which join the multicast.

8. The method of claim 7 wherein the host CPU is configured to associate the plurality of transcoder instances have joined the multicast with corresponding multicast streams.

9. The method of claim 1 wherein the synchronization IP packet comprises a null packet with a code word to identify the packet as a synchronization packet.

10. The method of claim 1 wherein transcoding the multicast stream of IP packets in response to detecting the synchronization IP packet comprises generating aligned segments of transcoded multicast stream across the two or more transcoder instances.

11. An apparatus configured to synchronize video in a system including a host central processing unit ("CPU") and a plurality of transcoder instances, the apparatus comprising:
    one or more computer processors; and
    a non-transitory computer-readable storage medium containing computer executable instructions that, when executed, control the one or more computer processors to be configured for:
        receiving, by two or more transcoder instances in the plurality of transcoder instances, a synchronization Internet Protocol ("IP") packet in a multicast stream of IP packets from the host CPU, wherein the synchronization IP packet comprises at least one distinctive code word to identify the synchronization IP packet among the IP packets of the multicast stream;
        detecting, by the two or more transcoder instances in the plurality of transcoder instances, the synchronization IP packet at the same point in the multicast stream, the point in the multicast stream detected by the two or more transcoder instances indicating a starting point to transcode the multicast stream of IP packets simultaneously by the two or more transcoder instances; and
        transcoding, by the two or more transcoder instances in the plurality of transcoder instances, the multicast stream of IP packets that begins from the indicated starting point responsive to detecting the synchronization IP packet.

12. The apparatus of claim 11 wherein the plurality of transcoder instances are in communication with a switch and wherein the switch is configured to receive the multicast stream of IP packets and send the multicast stream of IP packets to predetermined transcoder instances.

13. The apparatus of claim 12 wherein the switch is configured to use pointers to prevent multicast stream IP packet data from being copied or buffered by the plurality of transcoder instances.

14. The apparatus of claim 12 wherein the host CPU is in communication with the switch and wherein the host CPU is configured to insert the synchronization IP packet in the multicast stream.

15. The apparatus of claim 14 wherein the host CPU is configured to insert the synchronization IP packet into the multicast stream prior to the switch receiving the multicast stream.

16. The apparatus of claim 14 wherein the host CPU is configured to use a timer to determine an initialization time for the synchronization IP packet such that the synchronization IP packet is received by the two or more transcoder instances in the plurality of transcoder instances at the same point in the multicast stream.

17. The apparatus of claim 14 wherein the host CPU is configured to control the plurality of transcoder instances which join the multicast.

18. The apparatus of claim 17 wherein the host CPU is configured to associate the plurality of transcoder instances have joined the multicast with corresponding multicast streams.

19. The apparatus of claim 11 wherein the synchronization IP packet comprises a null packet with a code word to identify the packet as a synchronization packet.

20. The apparatus of claim 11 wherein transcoding the multicast stream of IP packets in response to detecting the synchronization IP packet comprises generating aligned segments of transcoded multicast stream across the two or more transcoder instances.

* * * * *